Dec. 19, 1961   C. P. FREER   3,013,727
FREEZE-PROOF WATER DISPENSING APPARATUS
Filed Feb. 25, 1959
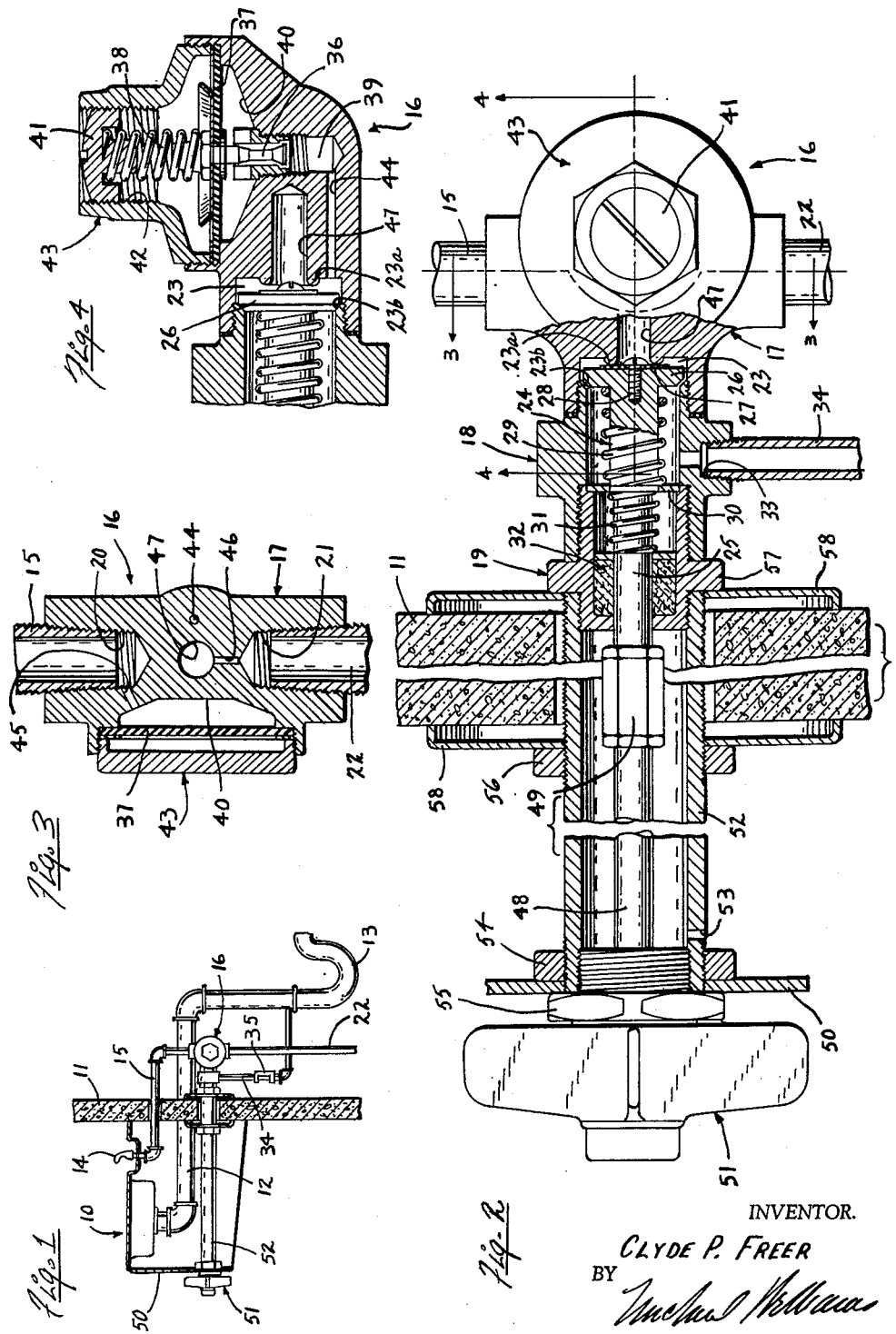
INVENTOR.
CLYDE P. FREER
BY
Attorney ID # United States Patent Office 3,013,727
Patented Dec. 19, 1961

3,013,727
FREEZE-PROOF WATER DISPENSING
APPARATUS
Clyde P. Freer, Warren, Ohio, assignor to Halsey W.
Taylor Company, Warren, Ohio
Filed Feb. 25, 1959, Ser. No. 795,466
7 Claims. (Cl. 239—29)

The present invention relates to water dispensing apparatus, more particularly to a freeze-proof drinking fountain, and the principal object of the invention is to provide new and improved devices of the character described.

Exteriorly located drinking fountains have long presented a problem in freezing weather. To prevent freezing of the water in the fountain with consequent bursting of pipes and other damage, it has been necessary to shut off the water supply to the fountain and to drain the latter. This, of course, renders the fountain unusable until the water supply is again turned on. Since it is impractical to turn the water supply off and drain the fountain before each freeze and to then turn the water on when the temperature again rises above freezing, conventional fountains are usually turned off and drained in advance of the first freeze of the season and are not turned on again until the freezing season is over. Obviously, this renders the fountain unusable for protracted periods of time even though temperatures may be well above freezing a considerable portion of such time.

The present invention provides a fountain which requires no attention to prepare it for freezing weather and which may safely be used throughout the year. Concededly, if the fountain is used when the temperature is below freezing, it may become clogged with ice; however, since the valve which controls water flow will not freeze, the pipes in the freezing zone will not be continually subject to inlet pressure and therefore such pipes will not freeze solid and thus damage thereto will be averted. Additionally, as soon as the temperature rises sufficiently to thaw the ice, the fountain will, without attention, once again function in the proper manner. These and other advantages will readily become apparent from a study of the following description and from the drawing appended hereto.

In the drawing accompanying this specification and forming a part of this application, there is shown, for purpose of illustration, an embodiment which the invention may assume, and in this drawing:

FIGURE 1 is a side elevational view, partially in section, illustrating a wall-hung drinking fountain embodying the present invention, FIGURE 2 is an enlarged, broken fragmentary view of the apparatus seen in FIGURE 1 with portions on the near side removed to show the underlying structure, FIGURE 3 is a sectional view generally corresponding to the line 3—3 of FIGURE 2, and FIGURE 4 is a fragmentary sectional view generally corresponding to the line 4—4 of FIGURE 2 but showing certain operating parts in another position.

With reference to FIGURE 1, there is illustrated a suitable fountain receptor, or bowl, 10 secured by any suitable means and at a convenient height to the outside of the wall 11 of a building or other structure. A drain pipe 12 leads from the receptor, through the wall 11 to the interior of the building and is connected to a conventional trap 13 which is in turn connected to the usual sewer (not shown). It will be understood that drain pipe 12 disposes of water dispensed by the fountain but not consumed by a user thereof. For a purpose to appear, the horizontal portion of drain pipe 12 will preferably be pitched downwardly from the receptor to insure against the collection of waste water therein which would freeze during cold weather.

Carried by the receptor is a suitable nozzle, or projector, 14 through which water is discharged for use. It will be understood that the unused water will be caught in the receptor and drained to the sewer through the drain pipe 12 above mentioned. Nozzle 14 is supplied with water through a pipe 15 which passes through an aperture in the building wall 11 and is connected to a valve 16 later to be described in detail. Pipe 15 is also preferable pitched to slope downwardly from the nozzle to the valve. As clearly shown in FIGURE 1, it is to be noted that valve 16 and trap 13 are both disposed on the inside of the building wall so as to be protected against freezing by the heat within the building.

Referring to FIGURE 2, valve 16 comprises a valve body which, for manufacturing and assembly purposes, is formed of parts 17, 18 and 19 suitably screw threaded together. As seen in FIGURE 3, body part 17 has an internally threaded outlet port 20 into which is threaded one end of the nozzle supply pipe 15. Also provided by body part 17 in opposed relation with outlet port 20 is an internally threaded inlet port 21 into which is threaded a water supply pipe 22 in communication with a source of water under pressure.

Still referring to FIGURE 2, the valve body is formed to provide a valve chamber 23 having spaced-apart, opposed valve seats 23a, 23b facing each other. For reasons to appear, seat 23a will be referred to as the inlet valve seat while seat 23b will be referred to as the drain valve seat.

Reciprocable within the valve body is a valve member 24 having a stem 25 which projects exteriorly of the valve body and an enlarged head 26 disposed within the valve chamber 23 between the inlet and drain valve seats. One side of valve head 26 is formed to provide a face for complementary sealing engagement with the drain valve seat 23b while the other side of the valve head carries a resilient washer 27, held in place by a screw 28, which provides a surface for complementary sealing engagement with inlet valve seat 23a. A spring 29 is interposed between the valve head 26 and a washer 30 seated within the valve body to resiliently urge the valve member to the normal position shown in FIGURE 2 wherein the valve head is engaged with the inlet valve seat and disengaged from the drain valve seat. A second spring 31 is interposed between washer 30 and a suitable packing gland 32 which encircles valve stem 25 at the place where it passes through the valve body to project outwardly thereof. Spring 31, it will be understood, maintains a continuous pressure upon packing gland 32 to effectuate a water-tight seal between the valve stem and the valve body and thus prevent escape of water from the valve body interior along the valve stem.

As seen in FIGURE 2, valve body part 18 is provided with an internally threaded drain port 33 which is in communication with the valve chamber 23 through the drain valve seat 23b. Port 33 is on the underside of the valve body for a purpose to appear and, by means of a pipe 34, is connected to drain pipe 12 (see FIGURE 1) above the trap 13. A conventional air gap 35 is interposed in the vertical portion of pipe 34 to insure that in the event sewage should back up above the trap, it will be discharged out through the air gap and will not travel up pipe 34 far enough to reach the valve 16.

In the present embodiment, valve 16 incorporates a pressure regulator device which insures constant water pressure at the nozzle 14 and therefore a constant stream height thereat despite varying water supply pressures. As best seen in FIGURE 4, such device comprises a flow control valve 36 connected with a flexible diaphragm 37. A spring 38 normally urges the diaphragm 37 and the attached valve to position wherein minimum obstruction to water flow is provided. Now, however, when water under pressure enters a chamber 39 beneath valve 36 in a manner to be disclosed, it will pass through the open valve and into a chamber 40 underlying the diaphragm. The water pressure in chamber 40 will exert an upward pressure on the diaphragm, deflecting spring 38 and partially closing the flow control valve 36 to reduce flow of water therepast and thus maintain a constant pressure in the chamber 40. Obviously, adjustment of the force exerted by spring 38 and consequent adjustment of the pressure in chamber 40 will be effectuated by variously positioning a threaded plug member 41 in an internally threaded, elongated bore 42 formed in a cover 43 which overlies the diaphragm.

Still referring to FIGURE 4, chamber 39 (which underlies the flow control valve 36) communicates with valve chamber 23, intermediate the inlet valve seat 23a and the drain valve seat 23b, by means of a conduit 44. Chamber 40 (which underlies diaphragm 37) communicates with outlet port 20 by means of a conduit 45 (see FIGURE 3). As also seen in this last-mentioned figure, inlet port 21 communicates with the valve chamber 23 through inlet valve seat 23a by means of a conduit 46 and (see FIGURES 2 and 4) a connecting conduit 47.

Means are provided for effecting movement of valve member 24 and as seen in FIGURE 2, a rod 48 is attached to the projecting end of valve stem 25 by means of a suitable coupling structure 49. Rod 48 extends through an enlarged aperture in wall 11 to the front skirt 50 of receptor 10 and its end adjacent the skirt 50 is attached to a suitable actuating handle structure 51 carried by the receptor skirt. Since the actuating handle structure forms no part of the present invention, it will not be described in detail; however, it is to be understood that when such handle is turned a relatively small amount in either direction from a central position, it will pull the rod 48 and consequently the valve member 24 to the left. Releasing the handle will permit its return to its central position under the driving impetus of valve spring 29 which continually urges the valve member 24 and consequently rod 48 to the right to the position seen in FIGURE 2.

Surrounding rod 48 and extending between valve body part 19 and the handle structure 51 is an elongated tube 52 whose respective ends preferably have threaded connection with the handle structure 51 and the valve body part 19. An aperture 53 is formed at the lowermost portion of that end of tube 52 adjacent the handle structure for a purpose to appear. The same end of tube 52 is externally threaded to receive a nut 54 which cooperates with a shoulder 55 on the handle structure to clamp receptor skirt 50 therebetween. The opposite end of tube 52 is also externally threaded to receive a nut 56 which cooperates with a radial enlargement 57 provided by valve body part 19 to clamp the wall 11 therebetween. The usual apertured disks 58 are assembled on tube 52, one being interposed between wall 11 and enlargement 57 of valve body portion 19 and the other being interposed between the wall and nut 56 to overlie the enlarged wall aperture through which tube 52 passes.

While valve 16 is presently deemed to be adequately supported by virtue of tube 52 being clamped to the front skirt 50 of the receptor and to the wall 11, and further by means of the pipes 15, 22 and 34 which are connected to the valve, it will readily be apparent that the valve may additionally be supported, if desired, by means of a suitable bracket structure (not shown) which could be secured to the valve body and the wall 11.

Operation of the hereinabove described apparatus will be as follows: With the parts positioned as seen in FIGURE 2, it will be understood that valve head 26 is being held against inlet valve seat 23a by means of spring 29 to thus block flow of water from the valve inlet port 21 to the valve chamber 23. Now, however, if handle 51 is rotated to shift rod 48 and consequently the valve member 24 to the left to the position seen in FIGURE 4, the valve head 26 will be shifted to sealing engagement with drain valve seat 23b to block flow of water therethrough and out of engagement with inlet valve seat 23a. With the valve head disengaged from the inlet valve seat, water will flow from the valve inlet port 21 to the valve chamber 23 via conduits 46, 47, to chamber 39 beneath the flow control valve 36 via conduit 44, past the flow control valve and into chamber 40 beneath the diaphragm 37, from chamber 40 to outlet port 20 via conduit 45, and thence through pipe 15 to the nozzle 14 for discharge therefrom. It is to be noted that since the valve head is at this time seated against the drain valve seat, no water can escape through the latter and down the pipe 34.

While handle 51 is released, spring 29 will return the parts to the position seen in FIGURE 2 wherein the valve head closes the inlet valve seat 23a and opens the drain valve seat 23b. With the drain valve seat open, the water standing at the nozzle 14 and in pipe 15 will gravitate through outlet port 20, conduit 45, chamber 40, past flow control valve 36, chamber 39, conduit 44, valve chamber 23, around valve head 26, through the drain valve seat 23b and the drain port 33, and down pipe 34 to the drain pipe 12. This, it will be understood, will drain all the exposed parts of the fountain of water to prevent freezing thereof.

It should be noted that tube 52, besides covering rod 48 and connecting the handle 51 and valve 16 into an integrated unit, serves yet another desirable function. In the event that packing 32 should begin to leak, the water will not escape into the interior of the building where considerable damage might be done before the leak is discovered. Instead, any water which escapes past such packing will be carried by tube 52 to the outside where it will harmlessly escape through tube aperture 53.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. Water dispensing apparatus comprising a receptor bowl securable to one side of a wall and having a depending skirt portion spaced from such wall, a valve housing disposed on the other side of said wall and having inlet and outlet ports together with an internal valve chamber through which fluid may flow from a source for discharge into said bowl, means providing a valve member within said chamber reciprocable toward and away from port closing relation and an elongated actuating stem projecting outwardly of said housing and through said wall for effecting movement of said valve member, packing means interposed between said actuating stem and said valve housing, and a tubular member extending from said valve housing through said wall and connected to said receptor bowl skirt portion for support thereby, said tubular member surrounding said actuating stem and having a drain opening disposed on said one wall side and such member collecting any fluid which may escape past said packing means and draining such escaped fluid on said one wall side.

2. Valve means for controlling flow of fluid comprising a valve housing having inlet and outlet passages communicating with an internally threaded recess and the latter being bottomed by an inlet valve seat at its juncture with said inlet passage, a sleeve member having one end threaded into said valve housing recess and terminating short of said recess bottom, said one sleeve member end providing a drain valve seat spaced from said inlet valve seat, a valve member having a head reciprocable within said recess for alternate engagement with said valve seats and having an actuating stem extending axially through said sleeve member, a cap threadably engaged with and closing the other end of said sleeve member and having an aperture through which said actuating stem slidably extends, packing means carried by said cap and interposed between the latter and said actuating stem for sealing purposes, conduit means projecting transversely of an intermediate portion of said sleeve member and communicating with the interior of the latter through a drain aperture formed in the underside of said sleeve member at a place intermediate said drain valve seat and said cap, and resilient means within said sleeve member intermediate said valve member head and said cap for yieldably urging said valve member head in a direction toward said valve housing recess bottom to sealing engagement with said inlet valve seat.

3. Valve means for controlling flow of fluid comprising a valve housing having inlet and outlet passages communicating with a recess formed in such housing, a valve member reciprocable within said recess between a first position blocking flow of fluid between said passages to a second position providing for fluid flow therebetween and said valve member having an actuating stem extending outwardly of said housing, a cap closing one end of said housing recess and having an aperture through which said actuating stem extends, packing means carried by said cap and engaged with said valve stem for sealing purposes, first resilient means surrounding said actuating stem and yieldably urging said valve member to one of its said positions, and second resilient means surrounding said actuating stem and exerting a compressive force on said packing means to insure sealing engagement thereof with said cap and said actuating stem.

4. The construction of claim 3 wherein said resilient means comprise respective helical springs of different strengths.

5. The construction of claim 4 wherein said springs are in end-to-end adjoining relation and wherein the adjoining spring ends are seated against a fixedly positioned abutment whereby the force exerted by the stronger spring will be isolated from the weaker.

6. Valve means for controlling flow of fluid comprising a valve housing for disposition on one side of a wall and having inlet and outlet ports together with an internal valve chamber through which fluid may flow from said inlet port to said outlet port, a valve member reciprocable within said valve chamber toward and away from port closing relation and having an actuating stem projecting outwardly of said valve housing and through the wall to the other side thereof, packing means interposed between said valve housing and said actuating stem for sealing purposes, and a tubular member surrounding said actuating stem and extending from said valve housing through the wall to the other side thereof and said tubular member having a downwardly facing drain opening remote from said valve housing and located on said other wall side, said tubular member collecting any fluid which may escape past said packing means and discharging such escaped fluid through said opening on said other wall side.

7. The construction of claim 2 wherein a receptor bowl is secured to one side of a wall and has a depending skirt portion spaced from such wall, wherein said valve housing is disposed on the other side of the wall and has its inlet connected to a source of drinking water under pressure and its outlet passage connected to a dispensing device for discharge into said bowl, wherein said actuating stem projects from said cap through the wall to said one wall side, wherein a tubular member surrounds said actuating stem and extends from said cap through the wall and is connected to said receptor bowl skirt portion for support thereby, and wherein said tubular member has a downwardly facing drain opening remote from said valve housing and located on said one wall side, said tubular member collecting any water which may escape past said packing means and discharging such escaped water through said opening on said one wall side.

References Cited in the file of this patent

UNITED STATES PATENTS

| | | |
|---|---|---|
| 142,521 | Seal et al. | Sept. 2, 1873 |
| 335,404 | Walsh et al. | Feb. 2, 1886 |
| 2,425,918 | Brown | Aug. 19, 1947 |
| 2,645,451 | Gladden | July 14, 1953 |
| 2,682,386 | Lindsay | June 29, 1954 |
| 2,709,622 | Erickson | May 31, 1955 |
| 2,819,926 | Wood | Jan. 14, 1958 |
| 2,840,110 | Parsons | June 24, 1958 |